US011196097B2

(12) United States Patent
Gu et al.

(10) Patent No.: US 11,196,097 B2
(45) Date of Patent: Dec. 7, 2021

(54) SUPERCAPACITOR CONTROL SYSTEMS AND METHODS

(71) Applicant: GM GLOBAL TECHNOLOGY OPERATIONS LLC, Detroit, MI (US)

(72) Inventors: Wentian Gu, Shanghai (CN); Haijing Liu, Shanghai (CN); Mark W. Verbrugge, Troy, MI (US); Zhiqiang Yu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 16/110,644

(22) Filed: Aug. 23, 2018

(65) Prior Publication Data
US 2019/0067754 A1 Feb. 28, 2019

(30) Foreign Application Priority Data

Aug. 24, 2017 (CN) .......................... 201710735511.1

(51) Int. Cl.
| F02N 11/08 | (2006.01) |
| H01G 11/22 | (2013.01) |
| H01G 11/54 | (2013.01) |
| H01M 10/0525 | (2010.01) |
| H01M 10/42 | (2006.01) |

(Continued)

(52) U.S. Cl.
CPC ......... *H01M 10/4264* (2013.01); *B60L 50/66* (2019.02); *F02N 11/0866* (2013.01); *H01G 11/08* (2013.01); *H01G 11/14* (2013.01); *H01G 11/22* (2013.01); *H01G 11/32* (2013.01); *H01G 11/54* (2013.01); *H01M 4/485* (2013.01); *H01M 4/505* (2013.01); *H01M 10/0525* (2013.01); *F02N 11/0814* (2013.01);

(Continued)

(58) Field of Classification Search
None
See application file for complete search history.

(56) References Cited

U.S. PATENT DOCUMENTS 4,473,815 A * 9/1984 Miller, Sr. .......... B60R 25/1018
180/287
7,806,095 B2 10/2010 Cook et al.
(Continued)

FOREIGN PATENT DOCUMENTS

| CN | 102263312 A | 11/2011 |
| CN | 202628356 U | 12/2012 |

(Continued)

OTHER PUBLICATIONS

Liu, Haijing et al., U.S. Appl. No. 16/110,618, filed Aug. 23, 2018 entitled "Systems and Methods for Monitoring of a Hybrid Energy Storage Device," 62 pages.

(Continued)

*Primary Examiner* — Haroon S. Sheikh
(74) *Attorney, Agent, or Firm* — Harness, Dickey & Pierce, P.L.C.

(57) ABSTRACT

A battery and supercapacitor system of a vehicle includes a lithium ion battery (LIB) disposed within a housing. The LIB includes: an electrolyte including lithium; and first and second electrodes disposed in the electrolyte. A supercapacitor is disposed within the housing and includes: the electrolyte; and third and fourth electrodes disposed in the electrolyte.

17 Claims, 7 Drawing Sheets

(51) Int. Cl.
    *H01M 4/485* (2010.01)
    *H01M 4/505* (2010.01)
    *B60L 50/60* (2019.01)
    *H01G 11/14* (2013.01)
    *H01G 11/08* (2013.01)
    *H01G 11/32* (2013.01)

(52) U.S. Cl.
    CPC .. *F02N 2200/101* (2013.01); *F02N 2200/102* (2013.01); *F02N 2200/103* (2013.01)

(56) References Cited

U.S. PATENT DOCUMENTS

| | | | |
|---|---|---|---|
| 7,963,264 B2 | 6/2011 | Reynolds | |
| 10,297,885 B2 | 5/2019 | Gayden et al. | |
| 2010/0075210 A1* | 3/2010 | Lee | H01M 16/003 429/94 |
| 2011/0293993 A1 | 12/2011 | Ryu | |
| 2012/0323435 A1 | 12/2012 | Miller et al. | |
| 2013/0266826 A1* | 10/2013 | Cowperthwaite | H01M 2/10 429/7 |
| 2014/0152261 A1 | 6/2014 | Yamauchi et al. | |
| 2014/0302352 A1* | 10/2014 | Lenz | H01M 10/4264 429/7 |
| 2016/0285137 A1 | 9/2016 | Gayden et al. | |
| 2017/0016419 A1 | 1/2017 | Siekkinen et al. | |
| 2018/0034037 A1 | 2/2018 | Zhang et al. | |
| 2018/0034094 A1 | 2/2018 | Liu et al. | |
| 2018/0287164 A1 | 10/2018 | Liu et al. | |
| 2019/0061555 A1 | 2/2019 | Liu et al. | |
| 2019/0157659 A1 | 5/2019 | Liu et al. | |

FOREIGN PATENT DOCUMENTS

| | | |
|---|---|---|
| CN | 103390764 A | 11/2013 |
| CN | 203381507 U | 1/2014 |
| CN | 105097289 A | 11/2015 |
| CN | 204937019 U | 1/2016 |
| CN | 205178537 U | 4/2016 |
| CN | 107039711 A | 8/2017 |
| CN | 109435672 A | 3/2019 |
| DE | 102018120481 A1 | 2/2019 |
| DE | 102018120484 A1 | 2/2019 |
| WO | WO-2017206095 A1 | 12/2017 |
| WO | 2018132992 A1 | 7/2018 |

OTHER PUBLICATIONS

First Office Action for Chinese Patent Application No. 20170735511.1 dated Mar. 3, 2020 with English language machine translation, 23 pages.
Chinese Office Action dated May 25, 2021 (corresponding to CN 201710736033.6).

* cited by examiner

FIG. 6

SUPERCAPACITOR CONTROL SYSTEMS AND METHODS

CROSS-REFERENCE TO RELATED APPLICATIONS

This application claims the benefit and priority of Chinese Patent Application No. 201710735511.1 filed Aug. 24, 2017. The entire disclosure of the above application is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to hybrid vehicle energy storage systems and more particularly to systems and methods for controlling energy storage devices including a combination of batteries and supercapacitors.

High-energy density, electrochemical cells, such as lithium-ion batteries, can be used in a variety of consumer products and vehicles. A stack of lithium-ion batteries may be electrically connected to such that the stack provides a greater overall output than the individual lithium-ion batteries.

A lithium-ion battery typically includes a first electrode, a second electrode, an electrolyte material, and a separator. One electrode serves as a positive electrode (or cathode), and another electrode serves as a negative electrode or anode. The separator and the electrolyte material are disposed between the first and second electrodes. The electrolyte conducts lithium ions and may be in solid or liquid form. Lithium ions move from a cathode (positive electrode) to an anode (negative electrode) during charging. Lithium ions move from the anode (negative electrode) to the cathode (positive electrode) during discharging.

SUMMARY

In a feature, a battery and supercapacitor system of a vehicle is described. A lithium ion battery (LIB) is disposed within a housing. The LIB includes: an electrolyte including lithium; and first and second electrodes disposed in the electrolyte. A supercapacitor is disposed within the housing and includes: the electrolyte; and third and fourth electrodes disposed in the electrolyte.

In further features: the first electrode of the LIB is connected to a first node; the second electrode of the LIB is connected to a second node; and the battery and supercapacitor system further includes a switch configured to connect and disconnect the third electrode of the supercapacitor to and from the first node.

In further features, a control module is configured to open the switch only when a current from the LIB and the supercapacitor is less than a predetermined current.

In further features, the predetermined current is less than 100 milliamps.

In further features, a second switch configured to connect and disconnect the fourth electrode of the supercapacitor to and from the second node.

In further features, a control module is configured to open the switch and the second switch only when a current flow from the LIB and the supercapacitor is less than a predetermined current.

In further features, the fourth electrode of the supercapacitor is directly connected to the second node.

In further features, a control module is configured to open the switch in response to a determination that a period since an internal combustion engine of the vehicle was last shut down is greater than a predetermined period.

In further features, a control module is configured to open the switch in response to a determination that an ignition key has been removed from an ignition switch of the vehicle.

In further features, a control module is configured to open the switch in response to a determination that a pressure on a driver's seat transitioned from greater than a predetermined pressure to less than the predetermined pressure.

In further features, a control module is configured to close the switch in response to a determination that a pressure on a driver's seat transitioned from less than a predetermined pressure to greater than the predetermined pressure.

In further features, a starter actuator module is configured to selectively connect a starter motor to the first and second nodes for engine startup.

In further features: the first electrode of the LIB is connected to a first node; the second electrode of the LIB is connected to a second node; the third electrode of the supercapacitor is connected to the first node; the fourth electrode of the supercapacitor is connected to the second node; no direct current (DC) to DC converters are connected between the third electrode of the supercapacitor and the first node; and no DC to DC converters are connected between the fourth electrode of the supercapacitor and the second node.

In further features: the LIB further comprises fifth and sixth electrodes disposed in the electrolyte; and the supercapacitor further comprises seventh and eighth electrodes disposed in the electrolyte.

In further features, the third and fourth electrodes of the supercapacitor are disposed between: the first and second electrodes of the LIB; and the fifth and sixth electrodes of the LIB.

In further features, the fifth and sixth electrodes of the LIB are disposed between: the third and fourth electrodes of the supercapacitor; and the seventh and eighth electrodes of the supercapacitor.

In further features: the first electrode includes lithium manganese oxide; and the second electrode includes lithium titanium oxide.

In further features, the third and fourth electrodes include activated carbon.

In a feature, a vehicle includes: a lithium ion battery (LIB) including: an electrolyte including lithium; a first electrode that is disposed in the electrolyte and that is connected to a first node; and a second electrode that is disposed in the electrolyte and that is connected to a second node; a supercapacitor including: the electrolyte; and a third electrode that is disposed in the electrolyte and that is connected to the first node; a fourth electrode that is disposed in the electrolyte and that is connected to the second node; a switch configured to connect and disconnect the third electrode of the supercapacitor to and from the first node; and a control module configured to: close the switch, thereby connecting the third electrode to the first node, for startup of an internal combustion engine; and open the switch only when a current from the LIB and the supercapacitor is less than a predetermined current.

In further features, the predetermined current is less than 100 milliamps.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5-7 include example diagrams including a multilayer LIB and a multilayer supercapacitor.

In the drawings, reference numbers may be reused to identify similar and/or identical elements.

DETAILED DESCRIPTION

A vehicle may include a lithium-ion battery (LIB) having one or more layers. A first component supplier may supply the LIB. The vehicle may also include a supercapacitor connected with the LIB. The supercapacitor may also include one or more layers. The supercapacitor may be used, for example, to supply current to a starter during engine startup and to limit current draw from the LIB for engine startup. However, supercapacitors self-discharge and, therefore, may draw power from the LIB when the LIB is not receiving power (e.g., via regenerative braking or via an alternator).

A second component supplier may supply the supercapacitor. A vehicle manufacturer or a third component supplier may integrate the LIB together with the supercapacitor. According to the present disclosure, the supercapacitor and the LIB include the same electrolyte and are implemented together within a housing. This may reduce a cost of the package including the supercapacitor and the LIB.

The supercapacitor and the LIB are connected in parallel. One or more switches are configured to allow the supercapacitor to be disconnected from the LIB.

A control module disconnects the supercapacitor from the LIB under no load or low load conditions. This prevents the supercapacitor from overly depleting charge from the LIB. For example, the control module may disconnect the supercapacitor when the engine has been off for a predetermined period, when an ignition key is not present in an ignition switch, or when driver input to shut down the engine (e.g., via an ignition key or button) is received. Additionally or alternatively, the control module may disconnect the supercapacitor when the driver leaves the driver's seat of the vehicle while the engine is off or when an object (e.g., key fob, mobile electronic device) leaves a predetermined area around the vehicle while the engine is off.

The control module connects the supercapacitor with the LIB for startup of the engine. For example, the control module may connect the supercapacitor when an ignition key is inserted into the ignition switch, when the object (e.g., key fob, mobile electronic device) enters the predetermined area, when the driver sits on the driver's seat of the vehicle, or when driver input to start the engine (e.g., via an ignition key or button) is received.

Figure 1:
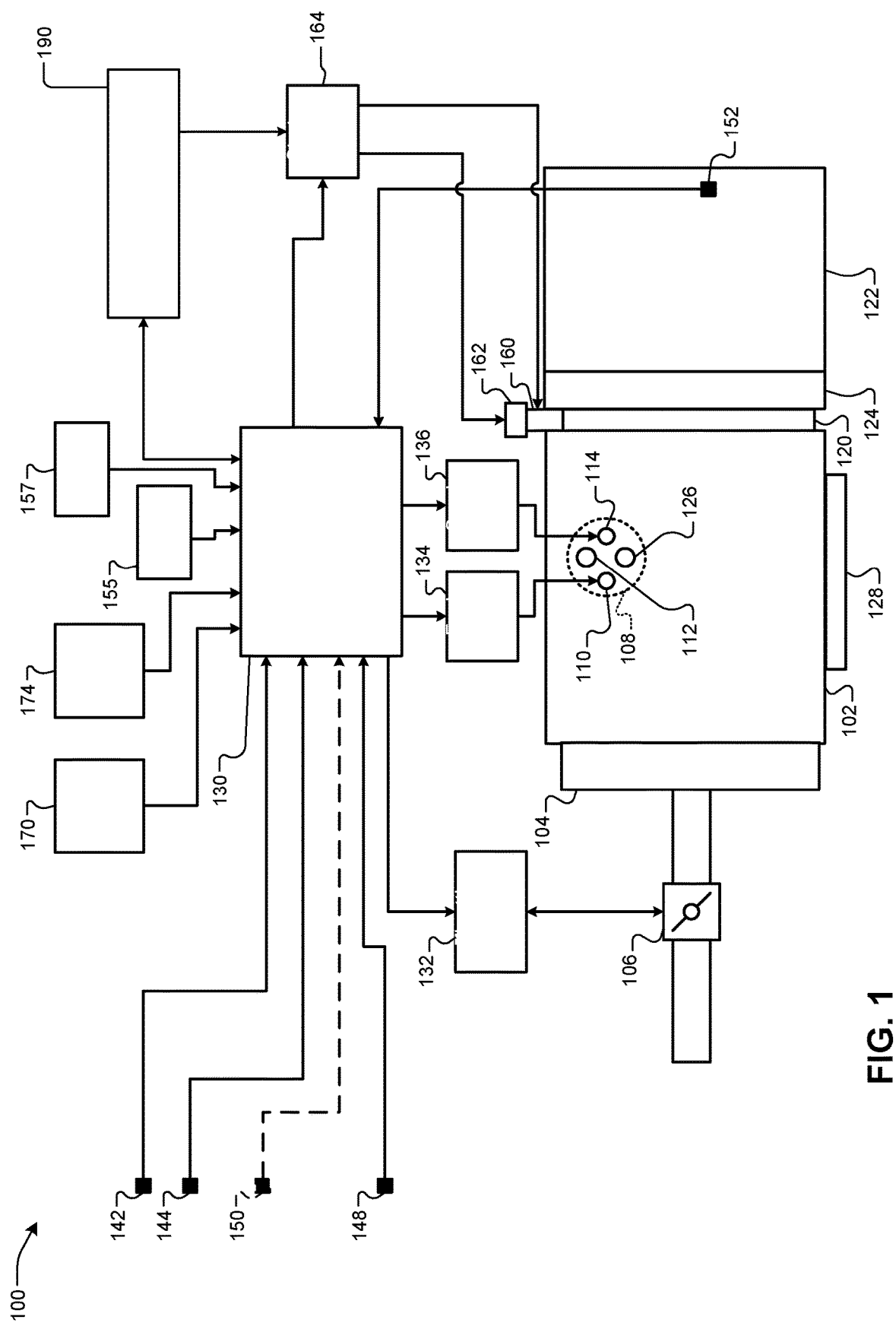
FIG. 1 if a functional block diagram of an example vehicle system.

Referring now to FIG. 1, a functional block diagram of an example vehicle system 100 is presented. An engine 102 combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into one or more cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. The fuel injectors may be associated with an electronic or mechanical fuel injection system, a jet or port of a carburetor, or another fuel injection system. The fuel injectors may be controlled to provide a desired air/fuel mixture for combustion, such as a stoichiometric air/fuel mixture.

An intake valve 112 opens to allow air into the cylinder 108. A piston (not shown) compresses the air/fuel mixture within the cylinder 108. In some engine systems, a spark plug 114 initiates combustion of the air/fuel mixture within the cylinder 108. In other types of engine systems, such as diesel engine systems, combustion may be initiated without the spark plug 114.

Combustion of the air/fuel mixture applies force to the piston, which rotatably drives a crankshaft (not shown). The engine 102 outputs torque via the crankshaft. A flywheel 120 is coupled to the crankshaft and rotates with the crankshaft. Torque output by the engine 102 is selectively transferred to a transmission 122 via a torque transfer device 124. More specifically, the torque transfer device 124 selectively couples the transmission 122 to the engine 102 and decouples the transmission 122 from the engine 102. The torque transfer device 124 may include, for example, a torque converter and/or one or more clutches. The transmission 122 may include, for example, a manual transmission, an automatic transmission, a semi-automatic transmission, an auto-manual transmission, or another suitable type of transmission.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls the torque output of the engine 102. For example only, the ECM 130 may control the torque output of the engine 102 via various engine actuators. The engine actuators may include, for example, a throttle actuator module 132, a fuel actuator module 134, and a spark actuator module 136. The engine 102 may also include one or more other engine actuators, and the ECM 130 may control the other engine actuators.

Each engine actuator controls an operating parameter based on a signal from the ECM 130. For example only, based on respective signals from the ECM, the throttle actuator module 132 may control opening of the throttle valve 106, the fuel actuator module 134 may control amount and timing of fuel injection, and the spark actuator module 136 may control spark timing.

The ECM 130 may control the torque output of the engine 102 based on, for example, driver inputs and various other inputs. The other inputs may include, for example, inputs from a transmission system, inputs from a hybrid control system, inputs from a stability control system, inputs from a chassis control system, and other suitable vehicle systems.

The driver inputs may include, for example, an accelerator pedal position (APP), a brake pedal position (BPP), and vehicle operation commands. An APP sensor 142 measures position of an accelerator pedal (not shown) and generates the APP based on the position of the accelerator pedal. A BPP sensor 144 measures position of a brake pedal (not shown) and generates the BPP based on the position of the brake pedal.

The vehicle operation commands may be made via actuation of, for example, an ignition key, one or more ignition buttons/switches, and/or one or more suitable vehicle ignition system inputs 148. In vehicles having a manual transmission, the driver inputs provided to the ECM 130 may also include a clutch pedal position (CPP). A CPP sensor 150 measures position of a clutch pedal (not shown) and generates the CPP based on the position of the clutch pedal.

In some implementations, the APP sensor 142, the BPP sensor 144, and the CPP sensor 150 may measure the position of the associated pedal and generate the APP, the BPP, and the CPP signals, respectively, based on the measured position of the associated pedal. In other implementations, the APP sensor 142, the BPP sensor 144, and the CPP sensor 150 may each include one or more switches and may generate the APP, the BPP, and the CPP, respectively, indicating whether the associated pedal is being actuated away from a predetermined resting position. While the APP sensor 142, the BPP sensor 144, and the CPP sensor 150 are shown and described, one or more additional APP, BPP, and/or CPP sensors may be provided.

A vehicle speed sensor 152 measures speed of the vehicle and generates a vehicle speed signal. For example only, the vehicle speed sensor 152 may generate the vehicle speed based on a transmission output shaft speed (TOSS), one or more wheel speeds, and/or another suitable measure of the vehicle speed. The ECM 130 may also receive operating parameters measured by other sensors 155, such as oxygen in the exhaust, engine speed, engine coolant temperature, intake air temperature, mass air flowrate, oil temperature, manifold absolute pressure, and/or other suitable parameters.

The ECM 130 selectively shuts down the engine 102 when a vehicle shutdown command (e.g., the ignition key or button is transitioned to OFF), is received. For example only, the ECM 130 may disable the injection of fuel, disable the provision of spark, and perform other engine shutdown operations to shut down the engine 102 when a vehicle shutdown command is received.

When a vehicle startup command (e.g., the ignition key is transitioned to ON) is received, a starter actuator module 164 actuates a starter motor actuator 162, such as a solenoid. Actuation of the starter motor actuator 163 engages a starter motor 160 with the engine 102. The starter motor 160 may engage the flywheel 120 or another suitable component that drives rotation of the crankshaft.

The starter actuator module 164 also applies power (current) to the starter motor 160 when the vehicle startup command is received. For example only, the starter actuator module 164 may include a starter relay. Application of power to the starter motor 160 drives rotation of the starter motor 160. Rotation of the starter motor 160 drives rotation of the engine 102. Driving rotation of the crankshaft to start the engine 102 may be referred to as engine cranking.

The starter motor 160 may automatically disengage the engine 102 or the starter motor actuator 162 may disengage the starter motor 160 from the engine 102 when an engine speed is greater than a predetermined speed. The starter actuator module 164 discontinues the current flow to the starter motor 160 when the engine speed is greater than the predetermined speed. For example only, the predetermined speed may be approximately 700 rpm or another suitable speed. Current is provided to the starter motor 160 by a battery and supercapacitor system 190, which is discussed further below.

While the example of vehicle startup and vehicle shutdown commands is provided, the engine 102 may also be started and shut down for auto-stop/start events and/or other events. The ECM 130 may shut down the engine 102 for the auto-stop portion of an auto-stop/start event when one or more predetermined auto-stop criteria are satisfied and vehicle shutdown has not been commanded (e.g., while the ignition key remains ON). The ECM 130 starts the engine 102 for the auto-start portion of an auto-stop/start event when one or more predetermined auto-start criteria are satisfied and vehicle startup has not been commanded. The ECM 130 may initiate auto stop events and auto start events, for example, based on the APP, the BPP, the vehicle speed, the CPP, one or more parameters of the battery and supercapacitor system 190, and/or one or more other suitable parameters. For example only, the ECM 130 may initiate an auto-stop event when the brake pedal is depressed and the vehicle speed is less than a predetermined speed. While the engine 102 is shut down for the auto stop event, the ECM 130 may selectively initiate an auto start event when the brake pedal is released.

In various implementations, the vehicle may include a passive entry module 170. The passive entry module 170 communicates wirelessly via one or more antennas and wirelessly detects the presence of an object within a predetermined distance of the vehicle. The object may include, for example, a key fob, a mobile device (e.g., cellular phone, tablet, etc.). The passive entry module 170 may unlock of doors of the vehicle and/or perform one or more other actions when the object is detected within the predetermined distance of the vehicle.

The vehicle may include a driver's seat sensor 174 that measures pressure applied to a seating surface of a driver's seat of the vehicle. The driver's seat sensor 174 may be implemented, for example, below or within the driver's seat. When the pressure applied to the seating surface of the driver's seat is greater than a predetermined pressure, the ECM 130 (or another module) may determine that a driver is seated on the driver's seat.

Figure 2:
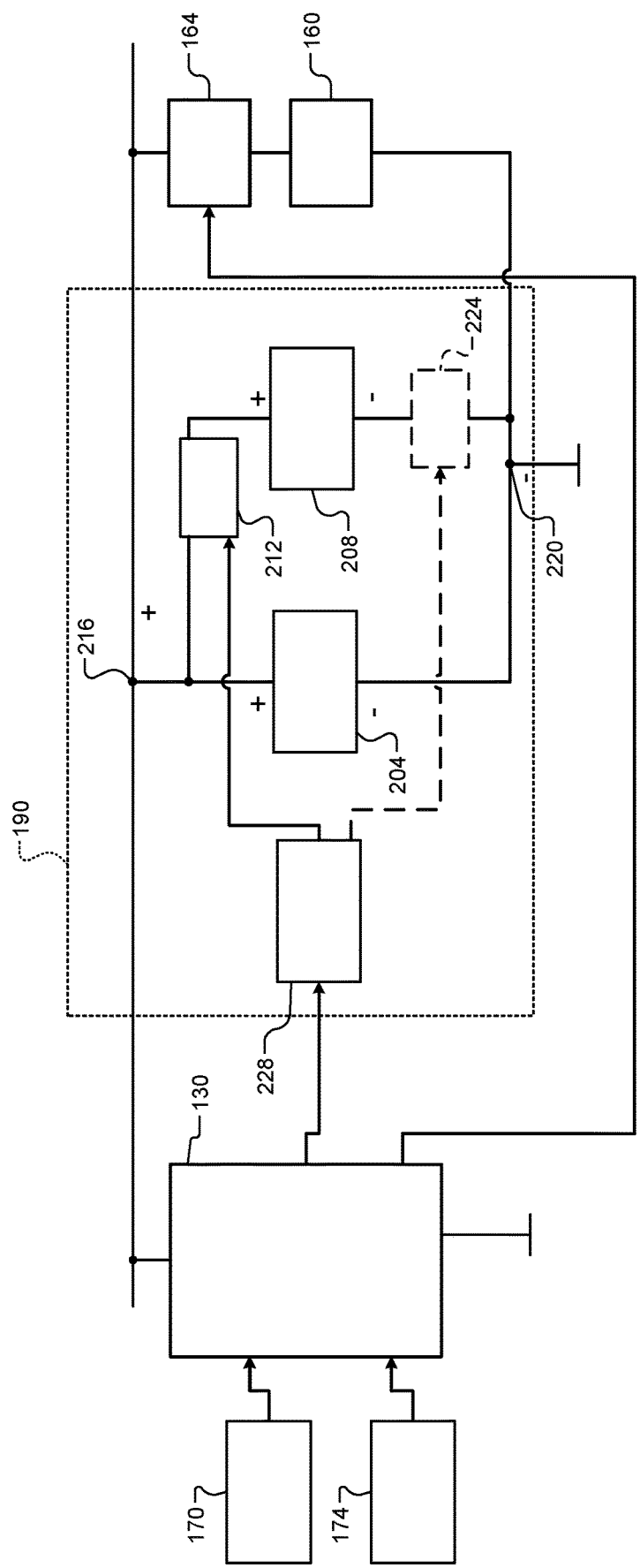
FIG. 2 is a functional block diagram including an example battery and supercapacitor system.

Referring now to FIG. 2, a functional block diagram including the battery and supercapacitor system 190 is presented. The battery and supercapacitor system 190 includes a lithium ion battery (LIB) 204, a supercapacitor 208, and a first switch 212. Supercapacitors can also be referred to as ultracapacitors. While the example of the battery and supercapacitor system 190 including a single layer LIB and a single layer supercapacitor is shown in FIG. 2, as discussed further below, the battery and supercapacitor system 190 may include a LIB having two or more layers and/or a supercapacitor having two or more layers.

A first portion (e.g., a first electrode) of the LIB 204 is connected to a positive node 216. A second portion (e.g., a second electrode) of the LIB 204 is connected to a negative node 220. The first switch 212 is configured to connect and disconnect a first portion (e.g., a first electrode) of the supercapacitor 208 to and from the positive node 216. A second portion (e.g., a second electrode) of the supercapacitor 208 may be connected to the negative node 220. In various implementations, a second switch 224 may be included where the second switch 224 is configured to connect and disconnect the second portion of the supercapacitor 208 to and from the negative node 220. A direct current (DC) to DC (DC/DC) converter is not needed (and is therefore not included) between the supercapacitor 208 and the positive and negative nodes 216 and 220.

To start the engine 102, the starter actuator module 164 applies power from the positive and negative nodes 216 and 220 to the starter motor 160. For example, the starter motor 160 may be directly connected to the negative node 220. The starter actuator module 164 may connect the starter motor 160 to the positive node 216, thereby applying power to the starter motor 160, for startup of the engine 102.

A switch control module 228 controls switching of the first switch 212. In implementations that also include the second switch 224, the switch control module 228 also controls switching of the second switch 224. The first switch 212 and the second switch 224 are break (open) under no load switches and are configured to be able to opened by the switch control module 228 (e.g., only) when current through the switch(es) is less than a predetermined current. In various implementations, the switch control module 228 may only open the first and second switches 212 and 224 when current is less than the predetermined current. The current may be measured using a current sensor. For example only, the predetermined current may be 10 milliamps (mA), 50 mA, 100 mA, or another suitable current indicative of the starter motor 160 not drawing current from the battery and supercapacitor system 190. The first and second switches 212 and 224 may be, for example, insulated gate bipolar transistors (IGBTs) or another suitable type of switch.

The switch control module 228 closes the first and second switches 212 and 224 before or for startup of the engine 102. For example, the switch control module 228 closes the first and second switches 212 and 224 in response to receipt of a vehicle startup command via user actuation of an ignition key, button, or switch while the vehicle is off. Additionally or alternatively, the switch control module 228 may close the first and second switches 212 and 224 in response to insertion of the ignition key into an ignition switch of the vehicle. Additionally or alternatively, the switch control module 228 may close the first and second switches 212 and 224 in response to the pressure measured by the driver's seat sensor 174 transitioning from less than a predetermined pressure to greater than the predetermined pressure. The pressure measured by the driver's seat sensor 174 transitioning from less than the predetermined pressure to greater than the predetermined pressure may indicate that a driver has sat down on the driver's seat. The predetermined pressure may be calibrated and may be greater than zero. Additionally or alternatively, the switch control module 228 may close the first and second switches 212 and 224 in response to a signal from the passive entry module 170 indicating that the object is within the predetermined distance of the vehicle. In various implementations, the switch control module 228 may receive the signal from the passive entry module 170 and the pressure from the driver's seat sensor from another module (e.g., the ECM 130) and/or a network, such as a controller area network (CAN) or another type of network.

The switch control module 228 maintains the first and second switches 212 and 224 closed until opening the first and second switches 212 and 224. After closing the first and second switches 212 and 224, the switch control module 228 may next open the first and second switches 212 and 224, for example, when the engine speed is zero (i.e., the engine 102 is shut down). Additionally or alternatively, the switch control module 228 may open the first and second switches 212 and 224 in response to receipt of a vehicle shutdown command via user actuation of an ignition key, button, or switch while the vehicle is on. Additionally or alternatively, the switch control module 228 may open the first and second switches 212 and 224 in response to removal of the ignition key into an ignition switch of the vehicle. Additionally or alternatively, the switch control module 228 may open the first and second switches 212 and 224 when the engine 102 has been shut down for at least a predetermined period. The predetermined period is greater than zero and may be calibratable. For example only, the predetermined period may be 5 minutes or another suitable period. Additionally or alternatively, the switch control module 228 may open the first and second switches 212 and 224 in response to the pressure measured by the driver's seat sensor 174 transitioning from greater than the predetermined pressure to less than the predetermined pressure. The pressure measured by the driver's seat sensor 174 transitioning from greater than the predetermined pressure to less than the predetermined pressure may indicate that the driver has left the driver's seat. Additionally or alternatively, the switch control module 228 may open the first and second switches 212 and 224 in response to the signal from the passive entry module 170 indicating that the object has left the predetermined distance of the vehicle.

While the example of the switch control module 228 controlling the first and second switches 212 and 224 is discussed above, the switch control module 228 may control only the first switch 212 or only the second switch 224 as discussed above.

Figure 3:
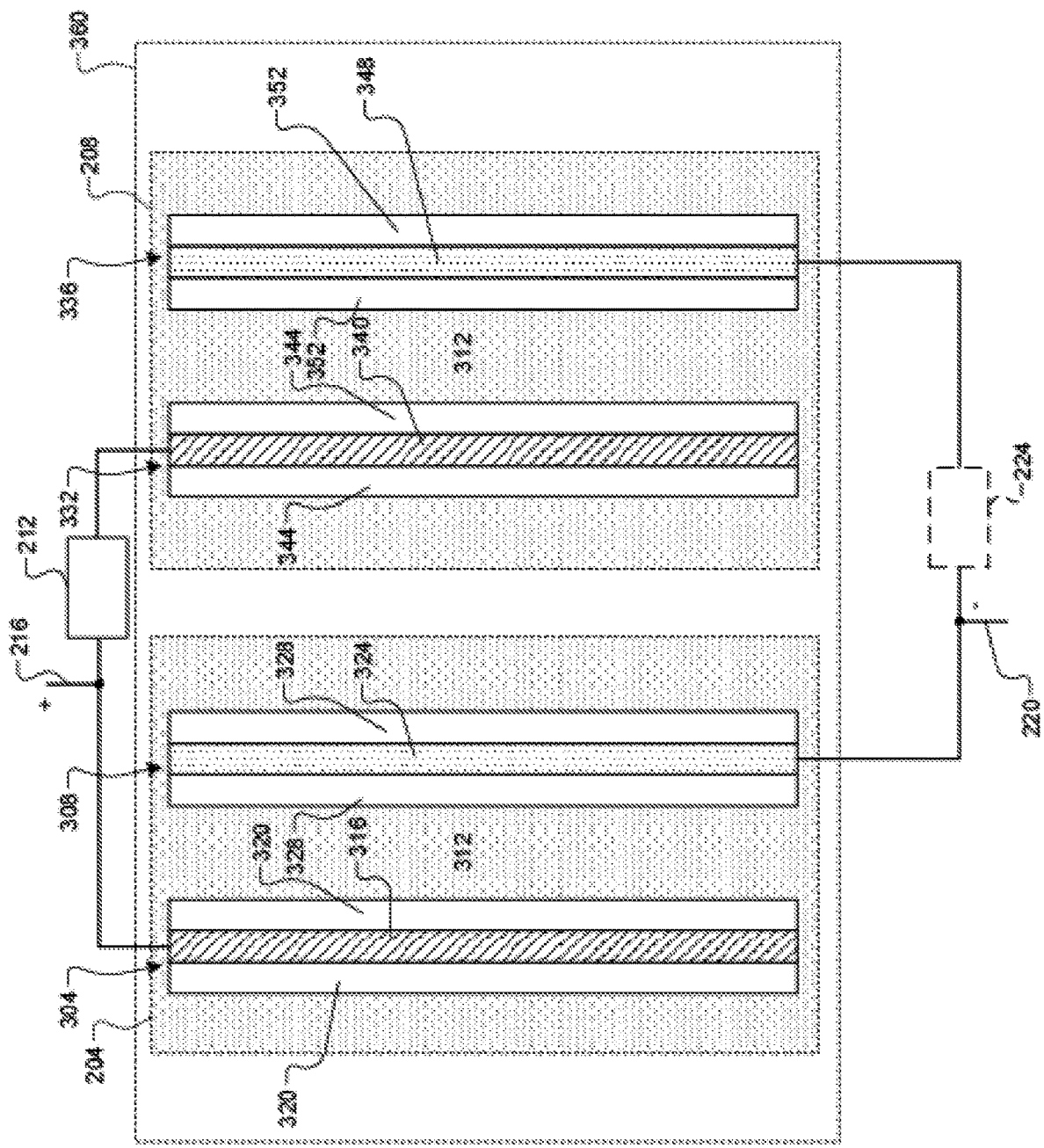
FIGS. 3-4 include example diagrams including a single layer Lithium ion battery (LIB) and a single layer supercapacitor.
Figure 4:
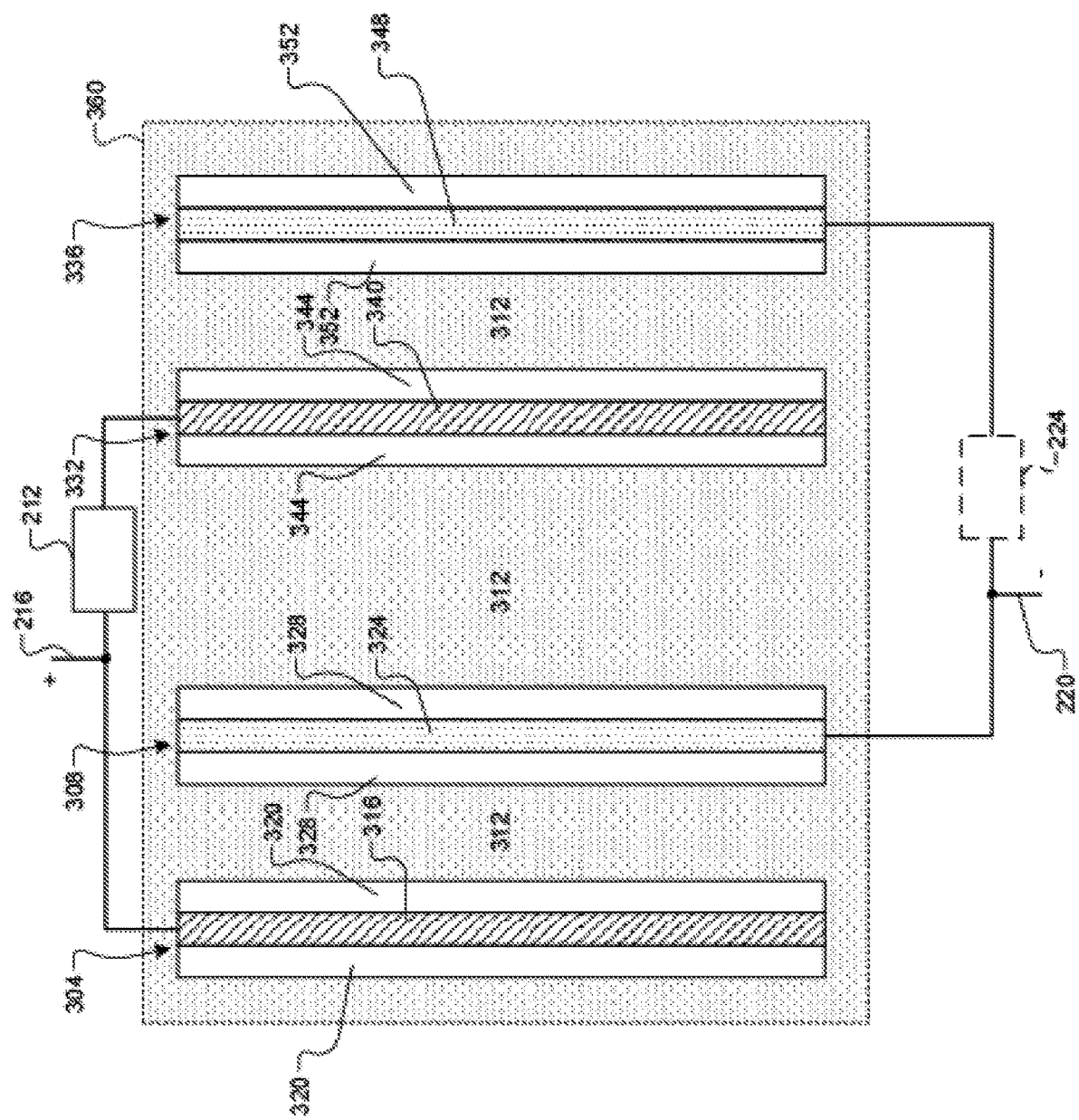

FIGS. 3 and 4 are example diagrams including the LIB 204 as a single layer LIB and the supercapacitor 208 as a single layer supercapacitor. The LIB 204 includes a first electrode 304, a second electrode 308, and an electrolyte 312. The single layer of the LIB 204 includes the first electrode 304 and the second electrode 308. The electrolyte 312 may be aqueous or non-aqueous. The electrolyte 312 may include, for example, one or more lithium salts and one or more solvents, such as one or more organic solvents. The electrolyte 312 may also include one or more other additives.

The first electrode 304 includes a first current conductor 316 and a first electrode material 320. The first electrode material 320 may be implemented on one or more sides or around the first current conductor 316. The first current conductor 316 may include, for example, aluminum or another suitable material. The first current conductor 316 is connected to the positive node 216. The first electrode material 320 may include, for example, lithium manganese oxide (LMO) or another suitable type of electrode material.

The second electrode 308 includes a second current conductor 324 and a second electrode material 328. The second electrode material 328 may be implemented on one or more sides or around the second current conductor 324. The second current conductor 324 may include, for example, copper or another suitable material. The second current conductor 324 is connected to the negative node 220. The second electrode material 328 may include, for example, lithium titanium oxide (LTO) or another suitable type of electrode material. The first electrode 304, the second electrode 308, and the electrolyte 312 may be housed within a battery housing.

The supercapacitor 208 includes a first electrode 332, a second electrode 336, and the electrolyte 312. The single layer of the supercapacitor 208 includes the first electrode 332 and the second electrode 336. The electrolyte of the supercapacitor 208 is the same as the electrolyte included in the LIB 204. In various implementations, the electrolyte may be different than the electrolyte included in the LIB 204. The use of the same electrolyte may reduce an overall cost of the LIB 204 and the supercapacitor 208.

The first electrode 332 includes a first current conductor 340 and a first electrode material 344. The first electrode material 344 may be implemented on one or more sides or around the first current conductor 340. The first current conductor 340 may include, for example, aluminum or another suitable material. The first current conductor 316 may (or should) be the same material as the first current conductor 340. The first current conductor 340 is connected to the positive node 216 via the first switch 212. The first electrode material 344 may include, for example, activated carbon (AC) or another suitable type of electrode material.

The second electrode 336 includes a second current conductor 348 and a second electrode material 352. The second electrode material 352 may be implemented on one or more sides or around the second current conductor 348. The second current conductor 348 may include, for example, copper or another suitable material. The second current conductor 348 may (or should) be the same material as the second current conductor 324. The second current conductor 348 is connected to the negative node 220. The second current conductor 324 may be directly connected to the negative node 220 or connected to the negative node 220 via the second switch 224. The second electrode material 352 may include, for example, AC or another suitable type of electrode material. The second electrode material 352 may be the same as the first electrode material 344. The first electrode 332, the second electrode 336, and the electrolyte 312 may be housed within a supercapacitor housing.

The LIB 204 (including the battery housing) and the supercapacitor 208 (including the supercapacitor housing) may be implemented separately (i.e., isolated) in separate housings. In various implementations, the battery housing and the super capacitor housing may be implemented together within a common housing 360.

As shown in FIG. 4, because the LIB 204 and the supercapacitor 208 both utilize the electrolyte 312, the battery housing and the supercapacitor housing may be omitted. The first and second electrodes 304 and 308 of the LIB 204 may be disposed in the electrolyte 312 within the housing 360 along with the first and second electrodes 332 and 336 of the supercapacitor 208.

As stated above, while the example of a single layer LIB and a single layer supercapacitor is discussed above, the LIB may include multiple layers and/or the supercapacitor may include multiple layers. Layers of a multilayer LIB are connected in parallel. Layers of a multilayer supercapacitor are connected in parallel, and the supercapacitor electrodes are connected to the positive node 216 via the first switch 212 and/or the negative node 220 via the second switch 224.

Figure 5:
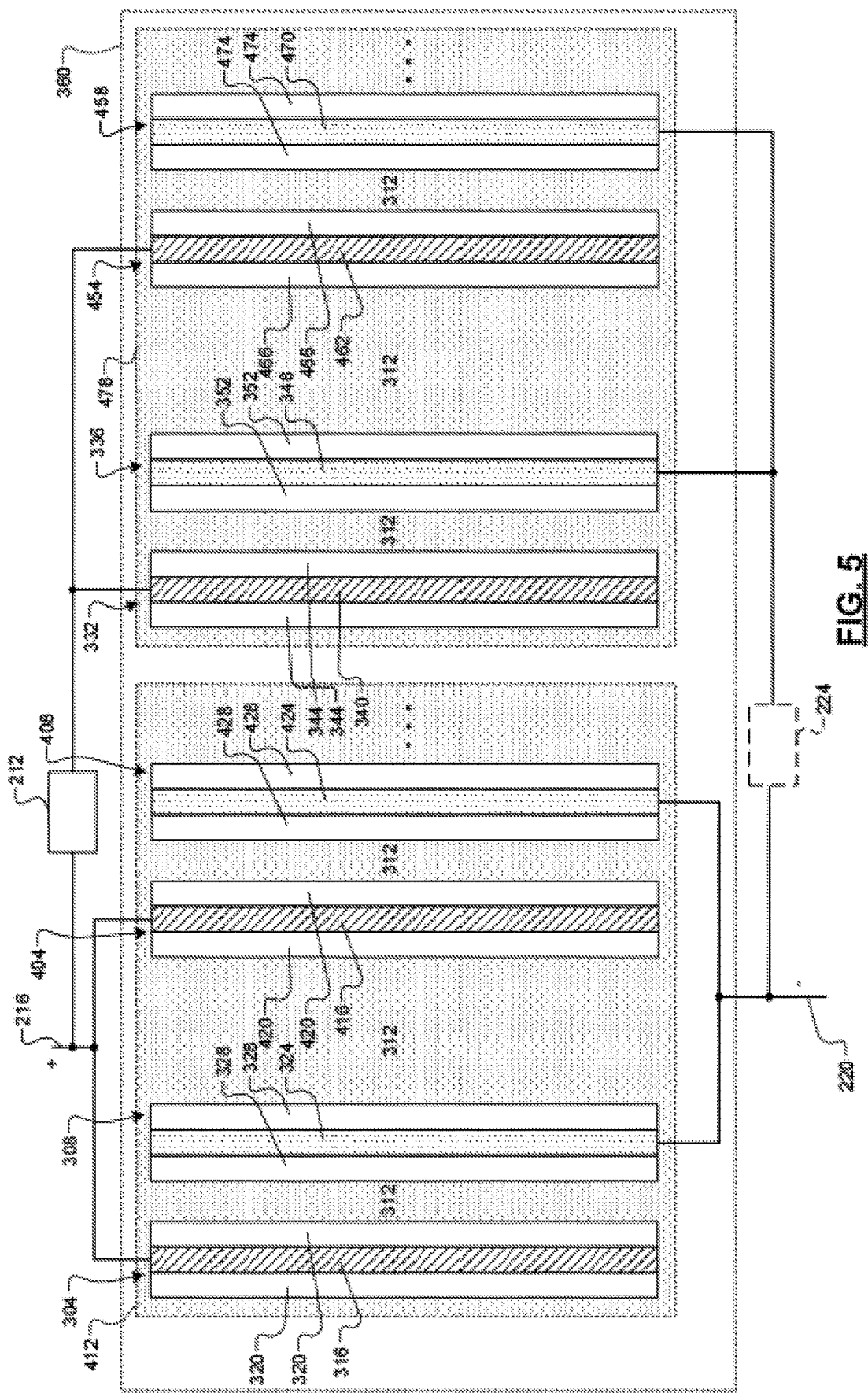
Figure 6:
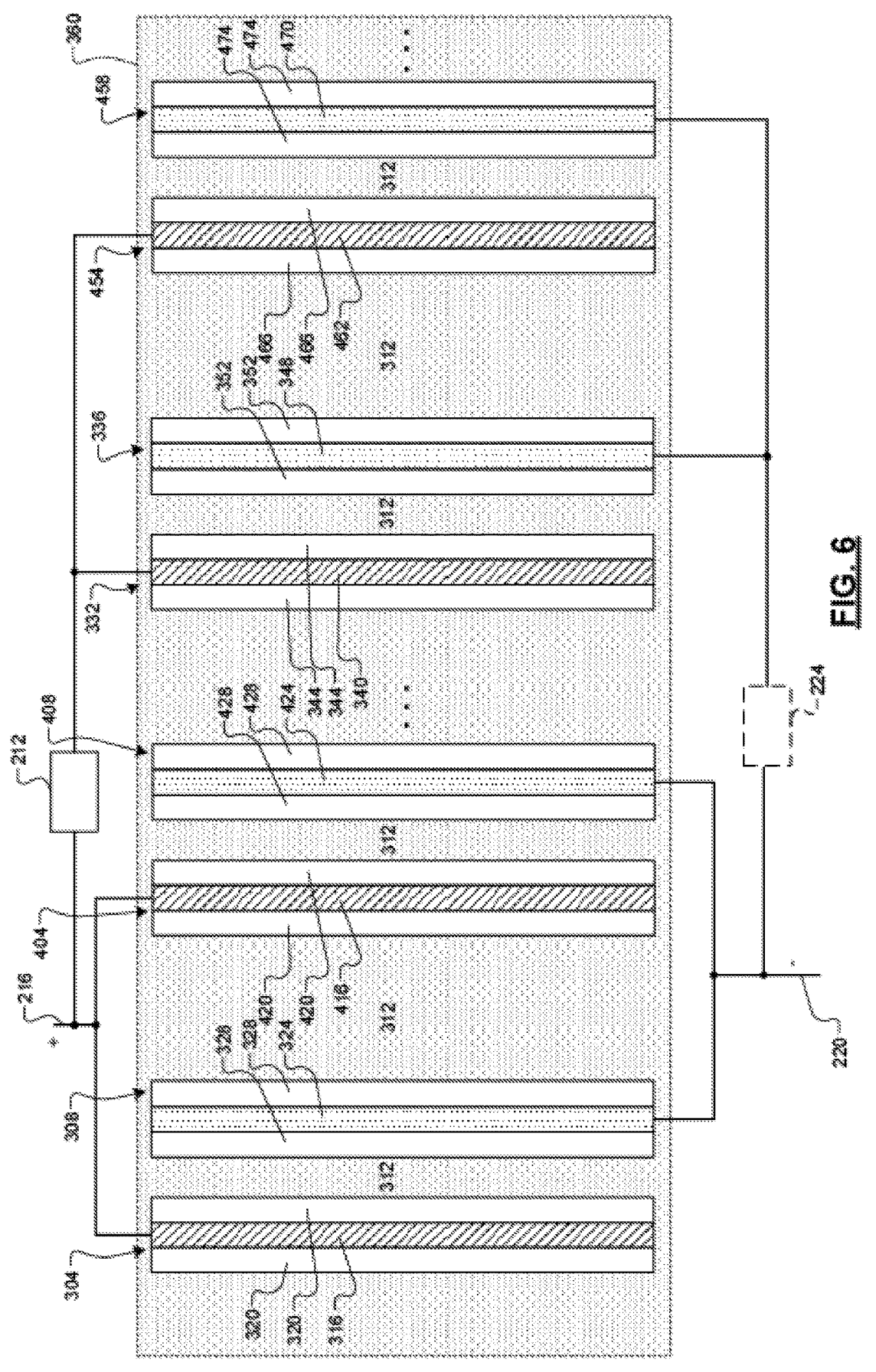

For example, FIGS. 5 and 6 are example diagrams including multilayer LIBs and multilayer supercapacitors. Each layer of an LIB includes a pair of electrodes. Each layer of a super capacitor includes a pair of electrodes. One or more additional layers of the LIB 204 may be connected in parallel. For example, a second pair of LIB electrodes may be connected in parallel with the electrodes of the LIB 204. The second pair of LIB electrodes includes a first electrode 404 and a second electrode 408.

The first electrode 404 includes a first current conductor 416 and a first electrode material 420. The first electrode material 420 may be implemented on one or more sides or around the first current conductor 416. The first current conductor 416 may include, for example, aluminum or another suitable material. The first current conductor 416 may be the same material as the first current conductor 316. The first current conductor 416 is connected to the first current conductor 316 and to the positive node 216. The first electrode material 420 may include, for example, LMO or another suitable type of electrode material. The first electrode material 420 may be the same material as the first electrode material 320.

The second electrode 408 includes a second current conductor 424 and a second electrode material 428. The second electrode material 428 may be implemented on one or more sides or around the second current conductor 424. The second current conductor 424 may include, for example, copper or another suitable material. The second current conductor 424 may be the same material as the second current conductor 324. The second current conductor 424 is connected to the second current conductor 324 and to the negative node 220. The second electrode material 428 may include, for example, LTO or another suitable type of electrode material. The second electrode material 428 may be the same material as the second electrode material 328.

While the example of the LIB 204 including two layers is shown, the LIB 204 may include one or more additional layers, as indicated by the ellipsis. The one or more additional layers are connected in parallel with the other layers of the LIB 204. The electrodes of all of the layers of the LIB 204 and the electrolyte may be housed within a battery housing 412.

Additionally or alternatively to the LIB 204 including multiple layers, the supercapacitor 208 may include multiple layers. For example, a second layer is connected in parallel with first layer of the supercapacitor 208. The second layer includes a first electrode 454 and a second electrode 458. In FIGS. 5 and 6, the electrolyte 312 of the supercapacitor 208 is the same as the electrolyte 312 included in the LIB 204. The use of the same electrolyte may reduce overall cost. The electrolyte of the supercapacitor 208, however, may be different than the electrolyte of the LIB 204.

The first electrode 454 includes a first current conductor 462 and a first electrode material 466. The first electrode material 466 may be implemented on one or more sides or around the first current conductor 462. The first current conductor 462 may include, for example, aluminum or another suitable material. The first current conductor 462 may be the same material as the first current conductor 340. The first current conductor 462 is connected to the positive node 216 via the first switch 212. The first electrode material 466 may include, for example, AC or another suitable type of electrode material. The first electrode material 466 may be the same material as the first electrode material 344.

The second electrode 458 includes a second current conductor 470 and a second electrode material 474. The second electrode material 474 may be implemented on one or more sides or around the second current conductor 470. The second current conductor 470 may include, for example, copper or another suitable material. The second current conductor 470 may be the same material as the second current conductor 324. The second current conductor 470 is connected to the second current conductor 324 and to the negative node 220. The second current conductor 470 may be directly connected to the negative node 220 or connected to the negative node 220 via the second switch 224. The second electrode material 474 may include, for example, AC or another suitable type of electrode material. The second electrode material 474 may be the same as the first electrode material 466.

While the example of the supercapacitor 208 including two layers is shown, the supercapacitor 208 may include one or more additional layers, as indicated by the ellipsis. The one or more additional layers are connected in parallel with the other layers of the supercapacitor 208. The electrodes of the supercapacitor 208 and the electrolyte 312 may be housed within a supercapacitor housing 478.

As shown in FIG. 6, however, because the LIB 204 and the supercapacitor 208 both utilize the electrolyte 312, the battery housing and the supercapacitor housing 478 may be omitted. The electrodes of the LIB 204 and the electrodes of the supercapacitor 208 may be disposed together in the electrolyte 312 within the housing 360.

Figure 7:
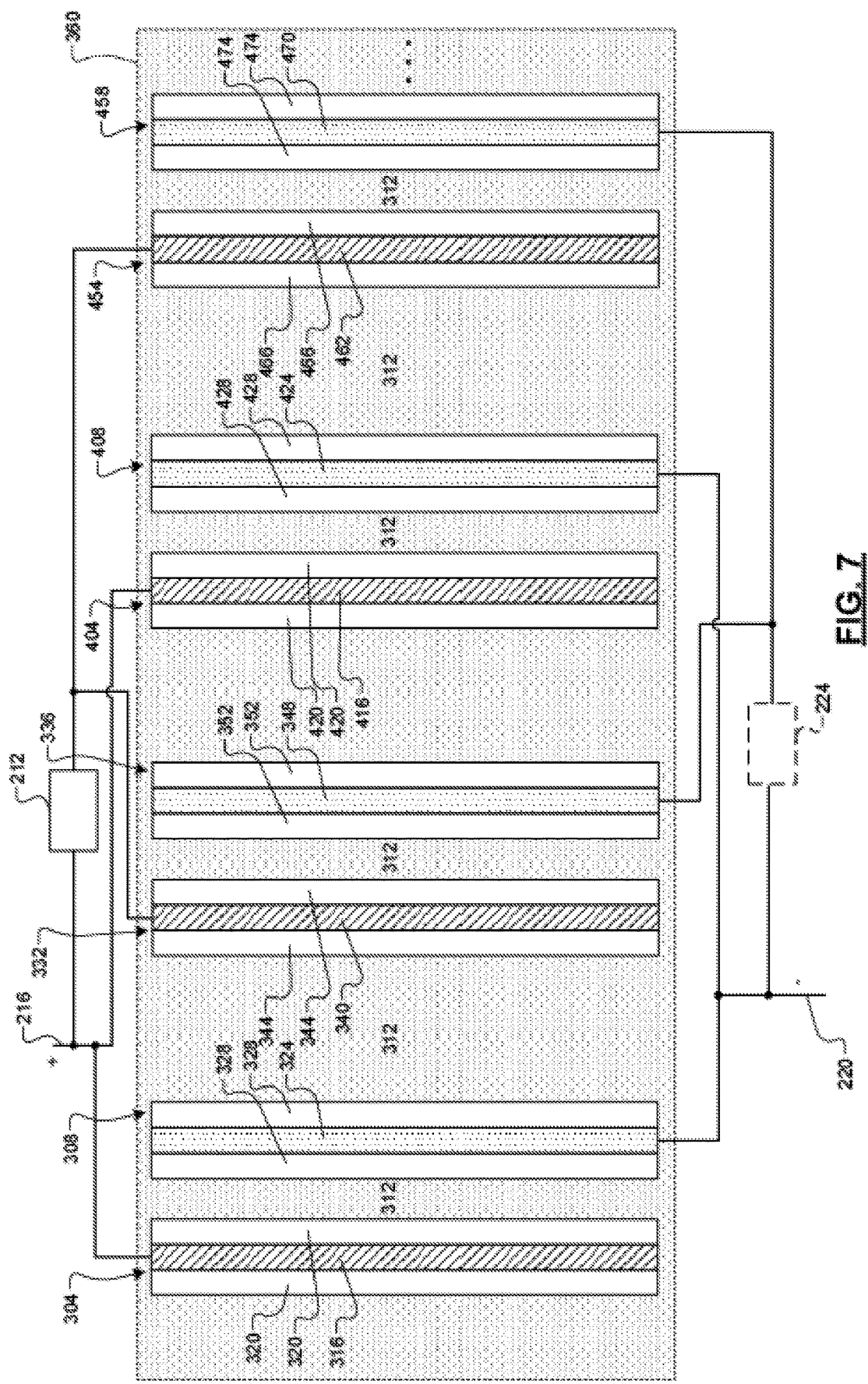

In various implementations, as shown in FIG. 7, electrodes of the supercapacitor 208 and electrodes of the LIB 204 may be intermixed. For example, a layer (including a pair of electrodes) of the supercapacitor 208 may be disposed between a layer (including a pair of electrodes) of the LIB 204, and/or a layer (including a pair of electrodes) of the LIB 204 may be disposed between a layer (including a pair of electrodes) of the supercapacitor 208. The intermixed structure could also be multiplied.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A battery and supercapacitor system of a vehicle, comprising:
   a housing;
   a lithium ion battery (LIB) within the housing, the LIB including:
      a first electrolyte comprising lithium; and
      first and second electrodes disposed in the first electrolyte, the first electrode being connected to a first node and the second electrode being connected to a second node;
   a supercapacitor within the housing, the supercapacitor including:
      a second electrolyte; and
      third and fourth electrodes disposed in the second electrolyte,
      wherein the first electrolyte is the same as the second electrolyte;
   a switch configured to connect and disconnect the third electrode of the supercapacitor to and from the first node; and
   a control module configured to:
      open the switch in response to a determination that a pressure on a driver's seat transitioned from greater than a predetermined pressure to less than the predetermined pressure; and
      close the switch in response to a determination that the pressure on the driver's seat transitioned from less than the predetermined pressure to greater than the predetermined pressure.

2. The battery and supercapacitor system of claim 1 wherein the control module is further configured to open the switch when a current from the LIB and the supercapacitor is less than a predetermined current.

3. The battery and supercapacitor system of claim 2 wherein the predetermined current is less than 100 milliamps.

4. The battery and supercapacitor system of claim 1 further comprising a second switch configured to connect and disconnect the fourth electrode of the supercapacitor to and from the second node.

5. The battery and supercapacitor system of claim 4 wherein the control module is further configured to open the switch and the second switch when a current flow from the LIB and the supercapacitor is less than a predetermined current.

6. The battery and supercapacitor system of claim 1 wherein the fourth electrode of the supercapacitor is directly connected to the second node.

7. The battery and supercapacitor system of claim 1 wherein the control module is further configured to open the switch in response to a determination that a period since an internal combustion engine of the vehicle was last shut down is greater than a predetermined period.

8. The battery and supercapacitor system of claim 1 wherein the control module is further configured to open the switch in response to a determination that an ignition key has been removed from an ignition switch of the vehicle.

9. The battery and supercapacitor system of claim 1 wherein:
   the third electrode of the supercapacitor is connected to the first node;
   the fourth electrode of the supercapacitor is connected to the second node;
   no direct current (DC) to DC converters are connected between the third electrode of the supercapacitor and the first node; and
   no DC to DC converters are connected between the fourth electrode of the supercapacitor and the second node.

10. The battery and supercapacitor system of claim 1 wherein:
    the LIB further comprises fifth and sixth electrodes disposed in the first electrolyte; and
    the supercapacitor further comprises seventh and eighth electrodes disposed in the second electrolyte.

11. The battery and supercapacitor system of claim 10 wherein the third and fourth electrodes of the supercapacitor are disposed between: the first and second electrodes of the LIB; and the fifth and sixth electrodes of the LIB.

12. The battery and supercapacitor system of claim 11 wherein the fifth and sixth electrodes of the LIB are disposed between: the third and fourth electrodes of the supercapacitor; and the seventh and eighth electrodes of the supercapacitor.

13. The battery and supercapacitor system of claim 1 wherein:
    the first electrode includes lithium manganese oxide; and
    the second electrode includes lithium titanium oxide.

14. The battery and supercapacitor system of claim 1 wherein the third and fourth electrodes include activated carbon.

15. A system comprising:
    the battery and supercapacitor system of claim 1; and a starter actuator module configured to selectively connect a starter motor to the first and second nodes for engine startup.

16. A vehicle system, comprising:
a lithium ion battery (LIB) including:
   a first electrolyte comprising lithium;
   a first electrode that is disposed in the first electrolyte and that is connected to a first node; and
   a second electrode that is disposed in the first electrolyte and that is connected to a second node;
a supercapacitor including:
   a second electrolyte; and
   a third electrode that is disposed in the second electrolyte and that is connected to the first node;
   a fourth electrode that is disposed in the second electrolyte and that is connected to the second node,
   wherein the first electrolyte is the same as the second electrolyte;
a switch configured to connect and disconnect the third electrode of the supercapacitor to and from the first node; and
a control module configured to:
   close the switch, thereby connecting the third electrode to the first node, when a pressure on a driver's seat transitioned from less than a predetermined pressure to greater than the predetermined pressure; and
   open the switch when the pressure on the driver's seat transitioned from greater than the predetermined pressure to less than the predetermined pressure.

17. The battery and supercapacitor system of claim 16 wherein the predetermined current is less than 100 milliamps.

* * * * *